United States Patent Office 3,112,289
Patented Nov. 26, 1963

3,112,289
PERYLENE-3,4,9,10-TETRACARBOXYLIC ACID DI-ANHYDRIDE PIGMENT FOR POLYMERIC MATERIALS
Emil Stocker, Riehen, near Basel, Switzerland, assignor to J. R. Geigy A.-G., Basel, Switzerland
No Drawing. Filed Dec. 18, 1959, Ser. No. 860,329
Claims priority, application Switzerland Dec. 19, 1958
9 Claims. (Cl. 260—41)

The present invention concerns a new process for the pigmenting in red shades of high molecular materials, that is of macromolecular organic compounds which can be made into forms. It also concerns, as industrial product, the substances which can be formed and which are pigmented red by the new process, as well as the goods formed therefrom.

It has been found that red pigmented high molecular compounds which are very fast to light and migration can be produced if perylene-3,4,9,10-tetracarboxylic acid dianhydride is incorporated into materials the substantial components of which are macromolecular organic compounds.

The macromolecular organic substances which can be used as starting compounds according to the invention can be of natural origin such as e.g. natural resins, drying oils and rubber. They can also be processed natural substances such as e.g. oil-modified alkyd resins (see e.g. "Kunststoff Lexikon," published by C. H. Verlag, Munich, Germany, 1953, p. 13), or the various cellulose derivatives. A particularly valuable class of starting compounds are the synthetic plastics, i.e. synthetic materials obtained by polymerisation, polycondensation and polyaddition. Of this class, the following are named in particular: polyethylene, polystyrene, polyvinyl chloride, polyvinyl acetate, polyacrylonitrile, polyacrylic acid and polymethacrylic acid esters, the condensation products of phenols, amines and amides with formaldehyde, polyesters both saturated such as e.g. alkyd resins and unsaturated such as e.g. maleic resins and, finally the polyaddition or polycondensation products of epichlorohydrin with diols or polyphenols known by the name "epoxy resins." It should be stressed that not only the homogeneous compounds but also mixtures of plastics as well as mixed condensates and mixed polymers such as e.g. those based on butadiene can be used.

A particularly valuable group of starting compounds are the so-called thermoplastics, i.e. the non-curable plastics. Of these, the polymers, in particular the vinyl polymers are preferred. Another very valuable group of high molecular compounds used according to the invention are the so-called film-formers or binding agents known as raw materials for lacquers.

Because of its high stability to heat, the pigment used according to the invention withstands practically unchanged the conditions prevailing in the final moulding.

The perylene-3,4,9,10-tetracarboxylic acid dianhydride is incorporated into the plastics for example, by admixing it by using rollers, mixing or milling apparatuses. The pigmented material is then brought to the final form desired by the known methods such as calendering, moulding, extrusion, coating, casting or by injection moulding. In order to produce articles which are not brittle or to reduce the brittleness of the end product, it is often necessary to incorporate so-called plasticisers into the macromolecular starting compounds before processing. Esters of phosphoric acid, phthalic acid or sebacic acid can be used for this purpose. The plasticisers can be incorporated either during the process according to the invention or after the pigment has been incorporated into the high molecular compounds. In addition, it is also possible to add fillers or other colouring components such as white, multi-coloured or black pigments to the macromolecular materials in order to attain qualitative or optical effects.

Many of the macromolecular compounds are widely used as raw materials for lacquers. Because of their excellent fastness properties, many of the red pigmented materials produced according to the invention are particularly well suited for this purpose. In particular alkyd resins, nitrocellulose, urea- and melamine-formaldehyde resins, vinyl and epoxyd resins and unsaturated polyester resins are used as raw materials for lacquers. To produce red lacquers according to the present process, the high molecular organic compounds and the perylene tetracarboxylic acid dianhydride, possibly together with additives such as fillers, other pigments, siccatives or plasticisers, are either finely dispersed or dissolved in an organic solvent or mixture of solvents. Either the individual components can be dissolved or dispersed alone or several can be dissolved or dispersed together and then the rest added.

Red pigmented high molecular compounds according to the invention contain in general amounts of 0.01 to 10%, preferably 0.1–5%, by weight of perylene tetracarboxylic acid dianhydride, calculated on the starting compound to be pigmented. The choice of the amount of pigment depends principally on the colour strength desired, then on the thickness of the articles and finally, possibly on the content of white pigment in the high molecular compound also.

Advantageously finely dispersed perylene tetracarboxylic acid dianhydride is used. The fine dispersion is obtained, for example, by precipitation from a solution. The best way is by dissolving the pigment in sulphuric acid monohydrate, oleum or chlorosulphonic acid and then pouring the solution into water. Instead of by precipitation, the pigment can also be obtained in a finely dispersed form by recrystallisation, for example by recrystallisation from more highly concentrated sulphuric acid or from nitrobenzene. Finally, the fine dispersion can be attained by milling in the presence of milling additives. Chiefly salt is meant by the latter which also serves as scouring agent. Actually, any salt of an inorganic or organic acid can be used provided that it is harder than the pigment to be milled and is inert to it and that it can easily be removed from the milling mixture for example by means of solvents. It is often advantageous to add small amounts of inert organic solvents as further milling additives.

A better colour yield, increased brilliance, more or less covering power or a changed shade can be attained by these after-treatments. For example, more brilliantly coloured high molecular materials are obtained in this way than if crude perylene tetracarboxylic acid anhydride is used, even when it was purified by the known method by dissolving with alkali lye and precipitating. On the other hand, the colour of the pigment can be influenced, for example more yellowish or bluish red pigments can be obtained by suitable conditions in the dissolving and reprecipitation or recrystallisation.

The high molecular compounds coloured with perylene tetracarboxylic acid dianhydride are distinguished by their very good stability to heat, cross-lacquering and migration fastness properties. In addition, they have very good fastness to rubbing and washing. The very good fastness to light which has already been mentioned is also present even with pale colours.

It could not have been foreseen that perylene-3,4,9,10-tetracarboxylic acid dianhydride, in spite of the carboxylic acid anhydride groups which themselves are reactive, can be incorporated into high molecular compounds and when so incorporated produce very beautiful abundant colourings which have very good fastness properties.

Details regarding the process according to the invention can be seen from the following examples which only serve to illustrate the invention and do not limit it in any way. Parts are given therein as parts by weight insofar as not otherwise expressly stated. The relationship of parts by weight to parts by volume is as that of grammes to cubic centimetres. The temperatures are in degrees centigrade.

Example 1

67 parts of polyvinyl chloride powder (suspension polymer), 33 parts of dioctyl phthalate, 2 parts of dibutyl tin dilaurate, 0.3 part of a light stabiliser, 7.0 parts of titanium dioxide (anatase) and 0.7 part of finely dispersed perylene-3,4,9,10-tetracarboxylic acid dianhydride (termed in the following PTCA) are mixed and worked for 10 minutes on a set of 160° hot mixing rollers. A film of 0.4 mm. thickness is then produced by calendering. It is very fast to light and is a beautiful red colour. The pigmenting is stable to heat and fast to migration.

The PTCA used is finely dispersed as follows: 20 parts of crude pulverised PTCA are added while stirring to 370 parts of 94% sulphuric acid and the mixture is stirred for 16 hours at room temperature. The mass is then poured into 4000 parts of water, the precipitate is filtered off, washed until the washing water is neutral, dried at 110° and pulverised.

If 88% sulphuric acid is used, then a somewhat more yellowish coloured pigment is obtained.

On using 100% sulphuric acid then also a somewhat more yellowish coloured, but also a somewhat stronger pigment is obtained.

Example 2

10 parts of crude PTCA are mixed with 30 parts of anhydrous calcium chloride and 5 parts of xylene and the mixture is milled for 1 hour in a ball mill with iron balls. The mixture is then poured into 1000 parts of water at 80°, stirred, and the precipitate is filtered off, washed and dried.

0.1 part of this pigment and 100 parts of polystyrene granulate are mixed and worked in a 130° hot set of mixing rollers until the colour appears to be homogeneous. The mass is then pressed at 150° between chromed sheets into sheet form. The red sheets have very good fastness to light. The pigmenting can also be performed in the extruder instead of the set of mixing rollers. In addition it is possible to granulate the homogeneously pigmented mass and then mould it in the injection moulding machine.

Example 3

10 parts of crude PTCA are refluxed for 2 hours in 240 parts of nitrobenzene. The PTCA is then filtered off hot, washed with ethanol and dried. A blueish red pigment is obtained.

0.1 part of the pigment so obtained, 0.5 part of titanium dioxide (anatase) and 100 parts of polyethylene granulate are mixed in a drum and the mixture is then worked on a 130° hot set of mixing rollers. The hot mass is pressed into sheet form or formed in the extruder. The articles have a beautiful red shade which has very good fastness to light.

Example 4

A finely milled paste made from 50 parts of polyvinyl chloride powder (emulsion polymer), 32 parts of dioctyl phthalate, 1 part of dibutyl tin dilaurate, 0.25 part of a light stabiliser, 6 parts of whiting, 10.75 parts of mineral spirits and 2.5 parts of a finely milled 40% paste of PTCA treated according to Example 1, paragraph 3, in dioctyl phthalate is placed in a coating of 0.2 mm. on cotton fabric. The coated fabric is then heated for 3 minutes at 160° whereupon another coating of 0.3 mm. is applied and the fabric is again heated for 3 minutes at 160°. A red leather cloth is obtained which has great fastness to night and migration and also good fastness to rubbing and washing.

Example 5

A rubber mixture of 40 parts of Hevea latex crepe, 24.5 parts of barium sulphate, 24.8 parts of whiting, 5.22 parts of lithophone, 4.0 parts of zinc oxide, 0.2 part of paraffin wax, 0.7 part of sulphur, 0.18 part of a vulcanising agent (Vulkacite P), 0.4 part of an anti-oxidant and 2.0 parts of PTCA previously treated according to Example 1, paragraph 2, is worked in a set of mixing rollers in the usual way and then vulcanised in the press for 10 minutes at 140°. A red pigmenting which has very good fastness to light is obtained. The vulcanisation can also be performed in open steam. In contact with white or differently coloured rubber, the pigment shows no tendency to migrate.

Example 6

100 parts of a pulverulent urea-formaldehyde resin suitable for moulding materials are thoroughly milled with 10 parts of lithopone and 1 part of PTCA previously treated according to Example 1, paragraph 2, and then pressed hot. Red articles having good fastness properties are obtained.

Example 7

4 parts of PTCA treated previously according to Example 1, paragraph 3, are added to 100 parts of a stoving lacquer consisting of 58.5 parts of a 60% solution of an alkyd resin derived from coconut oil, in xylene, 23 parts of a 65% solution of a melamine lacquer resin in butanol, 17 parts of xylene and 1.5 parts of butanol. The mixture is milled for 48 hours in a ball mill and then the lacquer so pigmented is sprayed onto a cleansed metal surface. After stoving at 120°, a deep red colouring is obtained which has great fastness to light and cross-lacquering.

Example 8

100 parts of a lacquer consisting of 50 parts of a 70% butanolic solution of a urea lacquer resin, 10 parts of a chlorodiphenyl plasticiser and 40 parts of xylene are pigmented with 4 parts of PTCA treated according to Example 1, paragraph 3, and the mixture is milled in a ball mill. After stoving, the lacquer obtained produces colourings having high stability to heat.

Example 9

15 parts of nitrocellulose containing 35% of butanol, 15 parts of a phthalate resin modified with castor oil, 15 parts of a 70% butanolic solution of a urea lacquer resin, 20 parts of butyl acetate, 10 parts of ethyl Cellosolve, 20 parts of toluene and 5 parts of alcohol are worked up into a lacquer. This is then pigmented with 2 parts of PTCA treated according to Example 3, paragraph 1, and 2 parts of titanium dioxide (rutile), and milled. After spraying this lacquer and allowing to dry, a red coating is obtained which has high fastness to light and cross lacquering.

Example 10

80 parts of an unsaturated liquid polyester resin, 19.72 parts of monostyrene and 0.28 part of siccative containing 16% of cobalt are milled with 4 parts of PTCA treated according to Example 1, paragraph 2. Shortly before the lacquer is used, a mixture of 4.15 parts of 70% cumol hydroperoxide, 2.52 parts of ethyl acetate and 13.33 parts of butyl acetate is added. After applying and drying, a red coating having good fastness properties is obtained.

Example 11

24.5 parts of unesterified epoxyd resin, 10.5 parts of an oil-reactive alkyl phenol resin (see e.g. "Kunststoff Lexikon," published by C. H. Verlag, Munich, Germany, 1953, pp. 14 and 171), 35 parts of xylene and 30 parts of diacetone alcohol are worked up into a lacquer which is milled with 5 parts of PTCA treated according to Example 1, paragraph 3. After spraying and stoving, coatings having good fastness properties are obtained.

What I claim is:

1. Pigmented lacquer consisting essentially of
   (a) film-forming ingredient selected from the group consisting of nitrocellulose, melamine formaldehyde resin, urea formaldehyde resin, oil-modified alkyd resin, unsaturated liquid polyester resin modified with monostyrene, and unesterified epoxy resin in mixture with oil-reactive alkylphenol resin,
   (b) organic solvent, and
   (c) from 0.01 to 10% by weight, calculated on the weight of (a), of perylene-3,4,9,10-tetracarboxylic acid dianhydride.

2. Pigmented lacquer of claim 1, wherein said pigment is in finely dispersed form obtained by dissolving and re-precipitating crude perylene-3,4,9,10-tetracarboxylic acid dianhydride in sulfuric acid.

3. Pigmented lacquer of claim 1, wherein said pigment is in finely dispersed form obtained by re-crystallization from sulfuric acid of a concentration of at least 85%.

4. Composition of matter comprising an intimate admixture of a member selected from the group consisting of polyvinylchloride and polyethylene, with perylene-3,4,9,10-tetracarboxylic acid dianhydride.

5. Composition of matter of claim 4, wherein said pigment is in finely dispersed form obtained by dissolving and re-precipitating crude perylene-3,4,9,10-tetracarboxylic acid dianhydride in sulfuric acid.

6. Composition of matter of claim 4, wherein said pigment is in finely dispersed form obtained by re-crystallization from sulfuric acid of a concentration of at least 85%.

7. Composition of matter comprising an intimate admixture of polystyrene with perylene-3,4,9,10-tetracarboxylic acid dianhydride.

8. A pigmented composition of matter comprising an intimate admixture of polyvinyl chloride with perylene-3,4,9,10-tetracarboxylic acid dianhydride.

9. A pigmented composition of matter comprising an intimate admixture of polyethylene with perylene-3,4,9,10-tetracarboxylic acid dianhydride.

References Cited in the file of this patent

UNITED STATES PATENTS

| | | |
|---|---|---|
| 1,917,153 | Pongratz | July 4, 1933 |
| 2,890,220 | Eckert et al. | June 9, 1959 |
| 2,905,685 | Eckert et al. | Sept. 22, 1959 |
| 2,905,686 | Eckert et al. | Sept. 22, 1959 |
| 3,006,882 | Altermatt et al. | Oct. 31, 1961 |

FOREIGN PATENTS

| | | |
|---|---|---|
| 749,495 | Germany | May 4, 1944 |

OTHER REFERENCES

Rodd: Chemistry of Carbon Compounds, vol. III, part B, 1956 (page 1508 relied on).